P. BAXTER.
LOCKING DEVICE FOR BOLTS, NUTS, AND THE LIKE.
APPLICATION FILED FEB. 14, 1919.
1,371,596. Patented Mar. 15, 1921.
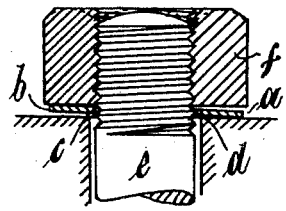
Fig: 1.
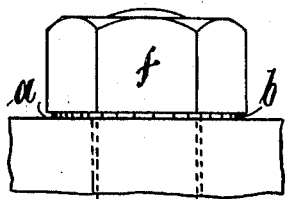
Fig: 2.
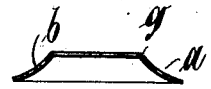
Fig: 3.
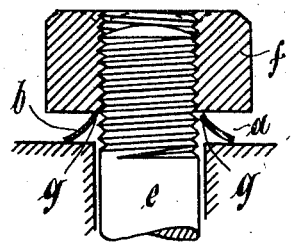
Fig: 4.
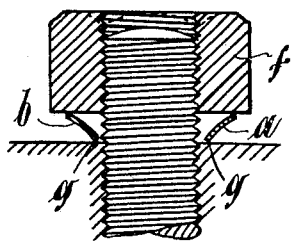
Fig: 6.
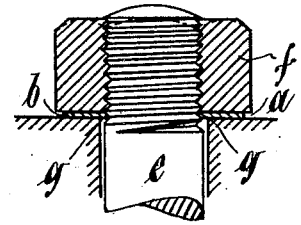
Fig: 5.
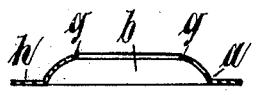
Fig: 7.
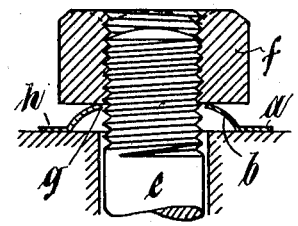
Fig: 8.
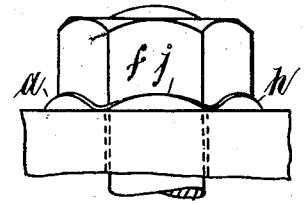
Fig: 9.
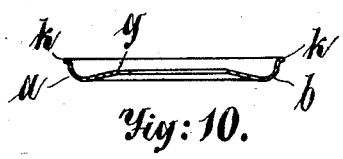
Fig: 10.
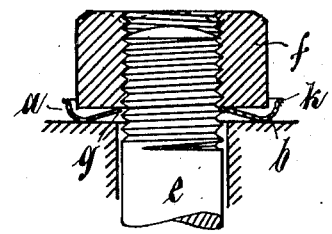
Fig: 11.
INVENTOR:
Paget Baxter
BY Wm Wallace White
ATTY.

UNITED STATES PATENT OFFICE.

PAGET BAXTER, OF LONDON, ENGLAND.

LOCKING DEVICE FOR BOLTS, NUTS, AND THE LIKE.

1,371,596.      Specification of Letters Patent.      Patented Mar. 15, 1921.

Application filed February 14, 1919. Serial No. 276,889.

*To all whom it may concern:*

Be it known that I, PAGET BAXTER, a subject of the King of Great Britain and Ireland, residing at 6ª Tudor street, in the city of London, England, have invented new and useful Improvements in Locking Devices for Bolts, Nuts, and the like, of which the following is a specification.

This invention relates to locking devices for bolts, nuts and the like and has for its object the construction of such a device in a simple and inexpensive manner which will automatically produce a locking action when the nut, bolt or other device is screwed up tightly and prevents the same working back under vibration on the one hand and can be tightened up again and slacked back on the other hand without destroying the locking effect of the washer.

According to this invention I arrange a washer of such a shape that when placed over the shank of the bolt or screw and brought under the pressure of the nut or the like during the tightening operation the said pressure will deform the washer and cause it to grip the shank of the bolt tightly. The washer may be provided with means for engaging the sides or corners of the nut or head of the screw or bolt so as to prevent the relative movement of bolt or screw and the nut or other device with which it is associated.

Referring to the drawings which form part of the specification:—

Figure 1 illustrates one form of washer adapted to carry out my invention in place upon a stud or the like.

Fig. 2 illustrates the same form of washer as that shown in Fig. 1 with the nut fully tightened.

Fig. 3 illustrates an alternative form of washer.

Fig. 4 illustrates the washer shown in Fig. 3 in place upon a stud or the like.

Fig. 5 illustrates the effect of tightening the nut upon the form of washer shown in Fig. 3.

Fig. 6 illustrates an alternative arrangement of washer suitable for adoption when both nut and abutment have threads therein.

Fig. 7 illustrates a modified form of the washer shown in Fig. 3 adapted to have an external portion which will corrugate and engage with the corners of the nut.

Fig. 8 illustrates the washer shown in Fig. 7 in place upon a stud or the like.

Fig. 9 illustrates the distortion of the washer shown in Fig. 7 during the tightening of the nut.

Fig. 10 illustrates a modification of the washer shown in Fig. 7, and

Fig. 11 shows the modified washer in place upon a stud or the like the nut being in the untightened position.

As shown in Figs. 1 and 2 the form of the washer $a$ is a disk $b$ having a plain hole through the center of such a size as to engage the bottom of the thread of the screw $e$ on one side $c$ and the top of the thread on the other side $d$. This washer can be threaded on to a screw such as $e$ but will be disposed on the said screw $e$ at an angle equal to half that of the pitch of the thread and therefore it is not at right angles with the axis of the said screw $e$.

When a nut or the like $f$ is screwed down it cants the washer $a$ into the right angled position as shown in Fig. 2, and forces the portion of the washer $a$ in contact with the said screw $e$ tightly against it so as to cause the said screw $e$ to be firmly gripped by the washer $a$ which in turn prevents rotation of the nut $f$ owing to the friction set up between the threads of the said nut $f$ and the screw $e$.

In an alternative form as shown in Figs. 3, 4, 5 and 6 the disk $b$ has the edge portion $g$ around the hole turned out of the plane away from the axis to a more or less extent and with such a construction the hole may be just clear of the screw $e$. With a washer of this form when the nut or the like $f$ is screwed down it flattens the turned up portion $g$ and forces the material inwardly so as to grip the said screw $e$ and hold the washer $a$ tightly thereon.

Any form of locking device can be provided on the washer $a$ to co-act with the nut $f$ or the like, but I prefer to form the outer part of the disk $b$ as shown in Figs. 7, 8 and 9 with flat portions $h$ of rather larger diameter than the distance across the angles of the nut or the like $f$. When the nut $f$ is screwed down the flat portion $h$ is gradually forced downward and during the process the said portion $h$ has an undulating or wavy movement imparted to it and when the nut $f$ is finally tight the crest $j$ of a wave is left between adjoining angles or corners and engages the flat joining them so as to produce a locking effect.

Alternatively I may form the outer part of the disk *b* with an upturned edge *k* so as to form a circular trough section (see Figs. 10 and 11) of rather larger diameter than the distance across the angles of the nut or the like *f*. When the nut *f* is screwed down the upturned edge *k* is gradually forced downward and during the process the said edge *k* has an undulating or wavy movement so that when the nut *f* is finally tight it is held by the waved part engaging it.

Under some conditions of use such for example as shown in Fig. 6 it may be desirable to place the washer *a* (see Figs. 3 and 7) with the part of larger diameter in contact with the nut *f* or the like, and it is obvious that such disposition may be made without departing from this invention.

I claim:—

1. A nut locking device, comprising a washer element having an undivided interior periphery of circular profile contained in a single plane, an undivided exterior periphery of circular profile contained in a single plane, said washer element being adapted to be stressed and deformed by the nut during normal tightening operation thereof, said stress and deformation causing the interior undivided periphery to engage with and grip the screw thread to effect automatic locking of the nut relative to the structure in or on which the nut is employed.

2. A nut locking device, comprising a washer element having an undivided interior periphery of circular profile contained in a single plane, an undivided exterior periphery of circular profile contained in a single plane, said washer element being adapted to be stressed and deformed by the nut during normal tightening operation thereof, said stress and deformation causing the said washer element to frictionally engage the screw and positively engage the nut to effect automatic locking.

3. A nut locking device, comprising a washer element having an undivided interior periphery of circular profile contained in a single plane, an undivided exterior periphery of circular profile contained in a single plane, said washer element comprising a dished washer adapted to pass over the thread of the screw and be flattened by the application of a nut to effect automatic locking by the interaction of the said washer with the screw thread the nut and the structure involved.

4. A nut locking device, comprising a washer element having an undivided interior periphery of circular profile contained in a single plane, an undivided exterior periphery of circular profile contained in a single plane, said washer element comprising a dished washer adapted to pass over the thread of the screw and be flattened by the application of a nut to effect automatic locking by the interaction of the said washer with the screw thread the nut and the structure involved, and a flat annular portion on the exterior periphery of the said dished washer adapted to corrugate and positively engage with the nut when said washer is flattened.

In testimony whereof I have signed my name to this specification.

PAGET BAXTER.